US008438199B1

(12) United States Patent
Cleveland, Jr. et al.

(10) Patent No.: US 8,438,199 B1
(45) Date of Patent: May 7, 2013

(54) SYSTEM AND METHOD FOR IDENTIFYING AND HIGHLIGHTING A GRAPHIC ELEMENT

(75) Inventors: Alton B. Cleveland, Jr., Glenmoore, PA (US); Mark D. Smith, Huntsville, AL (US)

(73) Assignee: Bentley Systems, Incorporated, Exton, PA (US)

( * ) Notice: Subject to any disclaimer, the term of this patent is extended or adjusted under 35 U.S.C. 154(b) by 295 days.

(21) Appl. No.: 12/879,760

(22) Filed: Sep. 10, 2010

Related U.S. Application Data (60) Provisional application No. 61/241,262, filed on Sep. 10, 2009.

(51) Int. Cl.
*G06F 17/30* (2006.01)

(52) U.S. Cl.
USPC ............................................ 707/957; 715/764

(58) Field of Classification Search .................. 707/715, 707/769, 794, 797, 798; 715/764
See application file for complete search history.

(56) References Cited

U.S. PATENT DOCUMENTS

| 5,027,291 | A | 6/1991 | Callahan et al. |
| 5,208,909 | A | 5/1993 | Corona et al. |
| 5,255,359 | A | 10/1993 | Ebbers et al. |
| 5,268,997 | A | 12/1993 | Funaki |
| 5,448,688 | A | 9/1995 | Hemmingway |
| 5,740,428 | A * | 4/1998 | Mortimore et al. ............ 1/1 |
| 5,748,946 | A | 5/1998 | Schneider |
| 5,950,207 | A * | 9/1999 | Mortimore et al. ............ 1/1 |
| 7,549,122 | B2 | 6/2009 | Miller et al. |
| 8,166,074 | B2 * | 4/2012 | Pettovello ............ 707/797 |
| 8,185,219 | B2 * | 5/2012 | Gilbert et al. ............ 700/83 |
| 2010/0037161 | A1 * | 2/2010 | Stading et al. ............ 715/764 |
| 2011/0018884 | A1 * | 1/2011 | Ritts et al. ............ 345/522 |

FOREIGN PATENT DOCUMENTS

| EP | 1388094 A1 * | 2/2004 |
| EP | 1667034 A2 * | 6/2006 |

* cited by examiner

*Primary Examiner* — Jean M Corrielus
(74) *Attorney, Agent, or Firm* — Cesari and McKenna, LLP (57) ABSTRACT

In one embodiment, improved techniques are provided for identifying and/or highlighting a graphic element. A multi-dimensional data structure corresponding to a visual representation of information may be created, wherein, for each active point in the visual representation of information, the multi-dimensional data structure has a corresponding location that stores a globally unique identifier (GUID) that indicates one or more graphic elements present at that point in the visual representation. A selection from a user of a selected point in the visual representation of information may be received. A location of the selected point may be used as an index into the multi-dimensional data structure to determine a particular location in the multi-dimensional data structure that coincides with the selected point. A particular GUID may be retrieved from the particular location and used to identify one or more graphic elements.

20 Claims, 8 Drawing Sheets

SYSTEM AND METHOD FOR IDENTIFYING AND HIGHLIGHTING A GRAPHIC ELEMENT

RELATED APPLICATIONS

This patent application claims priority to U.S. Provisional Patent Application Ser. No. 61/241,262, filed by Alton B. Cleveland, Jr. and Mark D. Smith, on Sep. 10, 2009 and entitled "System and Method for Identifying and Highlighting Graphic Element," which is incorporated by reference herein in its entirety.

U.S. Provisional Patent Application No. 61/241,262 incorporates by reference U.S. patent application Ser. No. 12/557,392, filed by Mark D. Smith, Alton B. Cleveland. Jr. and Stephan Cote, on Sep. 10, 2009, entitled "Augmented Reality Dynamic Plots," and accorded Cesari and McKenna. Accordingly, U.S. patent application Ser. No. 12/557,392 is also incorporated by reference herein in its entirety.

BACKGROUND

1. Technical Field

The present disclosure relates generally to information management and more specifically to techniques for identifying and/or highlighting a graphic element.

2. Background Information

To better manage the complexities of modern designs, engineers, architects, and other professionals often turn to graphics programs. Using a graphics program, an engineer, architect, and other professional may create and manipulate models, renderings or other depiction of a project, for example, of a physical system or structure. They may also view and analyze already produced models, renderings or other depiction of a project.

Typically, graphics programs provide some mechanism to allow a user to select a graphic element, i.e., a visual representation that corresponds to a component being rendered or otherwise displayed, to obtain information about that element. This information may include properties of the graphic element. For example, a graphic element may be a visual representation that corresponds to a pipe in a water distribution system being displayed, and the properties may include things such as the material the pipe is made of, the characteristics of the fluids the pipe can carry, a safe operating temperature of the pipe, and the like. Typically, such properties are not constantly displayed by a graphics program, as such detail would clutter the user interface. Accordingly, a user may be required to select a particular graphic element, and then somehow indicate the graphic element's properties are desired.

To select a graphic element, a user may position a selection cursor or other pointer at a point (an "input point") over the graphic element. According to one technique, such an input point may be used in conjunction with a geometric definition of is graphic elements, and, more specifically, with a graphic element range of the graphic elements, to select a particular graphic element. Typically, when graphic elements are created, so too are geographic definitions that, among other things, include a graphic element range that defines a space (e.g., a three dimensional cube) that encompasses the graphic element. When a user later selects an input point, the user's input point may be transformed from a coordinate space of the display screen to a coordinate space used with the graphic elements. For three-dimensional graphics programs, this may result in a "selection vector." Next, the graphics program may determine if this vector intersects any graphic element's graphic element range. A variety of known techniques, such as "range trees," may be used to help accomplish this task. For each element whose range intersects the selection vector, the graphics program may calculate a magnitude, and if this magnitude is less than a tolerance, the element may be selected.

According to another technique, the user's input point may be used to define a "pick window" around the user's input point. The extent of the pick window may be defined by a "pick tolerance." This technique may exploit display lists to identify graphic elements displayed in the "pick window." However, this technique also typically requires geometric definitions of graphic elements be available in order to function properly.

Sometimes geometric definitions and other information needed for range trees and pick windows are simply not available. For instance, some types of graphics programs use a client server approach, where a client application is remote from the server. In these applications, the client may not have access to the geometric definitions available on the server. One example of this type of application is a video streaming application, where the client receives a collection of image frames from a server. The stream of images may represent an animation of three-dimensional geometries, the movements of a user through a three dimensional space, or the like. In such cases, geometric definitions of objects being shown in the streaming video may be known by the server, but not by the client, where graphic element selections are being made.

Further, the extensive calculations needed for range trees and pick windows may be impractical for some types of computing devices, for example, for certain mobile appliances with limited processing power, limited storage space, etc.

Accordingly, there is a need for improved techniques for identifying and/or highlighting a graphic element that may address these and/or other shortcomings.

SUMMARY

In one embodiment, improved techniques are provided for identifying and/or highlighting a graphic element, that may operate absent the use of geometric definitions of graphic elements, and without consuming large amounts of processing power and/or other resources. When a plot (i.e., a visual representation of information) is defined, a processing system creates a special multi-dimensional data structure (e.g., a two-dimensional location buffer) that aids eventual graphic element identification and selection by a user. For each "active" point (e.g., dot or pixel that includes some element) in the plot, the multi-dimensional data structure stores a corresponding globally unique identifier (GUID) that indicates one or more graphic elements present at the point (e.g., a rendition identifier (ID)). The corresponding GUID is stored at a location in the multi-dimensional data structure that corresponds to the location of the point in the plot. The multi-dimensional data structure may be persistently maintained in connection with the plot, and used across multiple sessions of a graphics program.

A user may view the plot and select a point (a selected point) in the plot. When a user selects a point (a selected point) in the plot, the location of the selected point (e.g., an x-axis and y-axis coordinate associated with a two-dimensional coordinate space) may be used by the processing system as an index into the multi-dimensional data structure to retrieve the GUID of the one or more graphic elements. If the retrieved GUID corresponds to a single graphic element, the graphics program identifies that graphic element, and, for example, retrieves properties or other information associated with that graphic element for display. If the retrieved GUID corresponds to multiple graphic elements, the graphics program may identify multiple graphic elements, or further techniques may be employed to pinpoint a single graphic element. For example, properties of each of the graphic elements may be retrieved, or, alternatively, a user may be prompted to select from a list one of the multiple graphic elements for which properties are desired. Further, is the graphics program may highlight one or more graphic elements corresponding to the retrieved GUID on the display screen, by iterating over locations within the multi-dimensional data structure, identifying locations that share the retrieved GUID, and changing the visual display (e.g., the color of) pixels on the display screen that correspond to the identified locations that share the retrieved GUID.

BRIEF DESCRIPTION OF THE DRAWINGS

The description below refers to the accompanying drawings of example embodiments, of which.

DETAILED DESCRIPTION

I. Definition of Terms

As user herein the term "graphic element" shall be understood refer to a visual representation that corresponds to a component being rendered or otherwise displayed. For example, a graphic element may be a visual representation that corresponds to a wall, a pipe, a valve, a pump or any of wide range of other types of components, for instance, in a computer aided design (CAD) drawing or model, being displayed by a graphics program.

As used herein the term "graphics program" shall be understood to refer to computer program code that, when executed, is capable of displaying on a display screen a visual representation of information. For example, a graphics program may be a CAD program, an image editing program, an image viewing program, or another type of program.

As used herein the term "plot" shall be understood to refer to a visual representation of information that may be maintained in an electronic file stored on a computer-readable medium and/or printed on a piece of paper or other flat surface. A plot may take the form of a CAD drawing, such as a blueprint, a schematic, an elevation, a rendering, etc., or another type of representation, such as a photographic image, a text listing, etc.

As used herein the term "paper plot" shall be understood to refer to a plot printed on a piece of paper or other flat surface. A paper plot shall not include copies maintained in an electronic file stored on a computer-readable medium.

As used herein the term "electronic plot" shall be understood to refer to a plot maintained in an electronic file stored on a computer-readable medium. An electronic plot may take the form of a MicroStation® design (.dgn) file, an AutoCAD® drawing (.dwg) file, a Portable Document Format (.pdf) file, a Joint Photographic Experts Group (.jpg) file, a bit map (.bmp) file, or other type of file. An electronic plot shall not include copies printed on a piece of paper.

As used herein the term "dynamic plot" shall be understood to refer to a paper plot for which corresponding metadata stored on a computer-readable medium is available. The metadata shall comprise information beyond that which is printed on the paper plot.

As used herein the term "mobile appliance" shall be understood to refer to an electronic device and that is adapted to be readily transportable by a user, for example, is adapted to be carried by the user on their person. A "mobile appliance" may be an ultra mobile personal computer (PC) (collectively UMPC), a tablet PC, a personal digital assistant (PDA), an electronic book (e-book) reader, a cellular telephone, a digital camera, or other similar type of portable electronic device.

As used herein the term "processing system" shall be understood to refer to one or more electronic devices that include at least a processor (e.g., a central processing unit (CPU), an application specific integrated circuit (ASIC), etc.) and a non-transitory storage medium (e.g., a volatile or persistent memory, a hard-disk, a compact disk (CD), etc.) A "processing system" may be one or more mobile appliances, one or more desktop computers, one or more servers, some combination thereof, or any of a variety of other types of electronic device(s) that include the above discussed components.

II. Example Embodiments

While the improved techniques for identifying and/or highlighting a graphic element described herein may be used with a variety of types of graphics programs, system architectures, and environments, for purposes of illustration, the techniques are described below in conjunction with augmented reality viewing of dynamic plots (special types of paper plots). The below description first provides an overview of an architecture for displaying an augmented reality view of a dynamic plot. More detailed discussion of augmented reality viewing of dynamic plots may be found in U.S. patent application Ser. No. 12/557,392, which was incorporated by reference above. The description then discusses techniques for identifying and/or highlighting a graphic element that, for example, may be displayed in such an augmented reality view. It should be emphasized that such techniques for identifying and/or highlighting a graphic element may be readily adapted for use in programs, system architectures, and environments that do not involve augmented reality viewing and/or dynamic plots.

Dynamic Plots

Briefly, to display an augmented reality view of a dynamic plot, a camera of a mobile appliance may be used to capture an identifier (e.g., a barcode) printed on the dynamic plot, which is subsequently decoded to determine a unique plot ID. Using the unique plot ID, corresponding metadata for the dynamic plot may be obtained. The camera may further capture images of elements printed on the dynamic plot. These images may be augmented, using augmented reality techniques, before they are displayed as graphic elements on a display screen of the mobile appliance. For example, a user may query properties of an element printed on the dynamic plot, and the mobile appliance may display a corresponding graphic element annotated with the requested properties on the display screen, to provide such information to a user.

Figure 1:
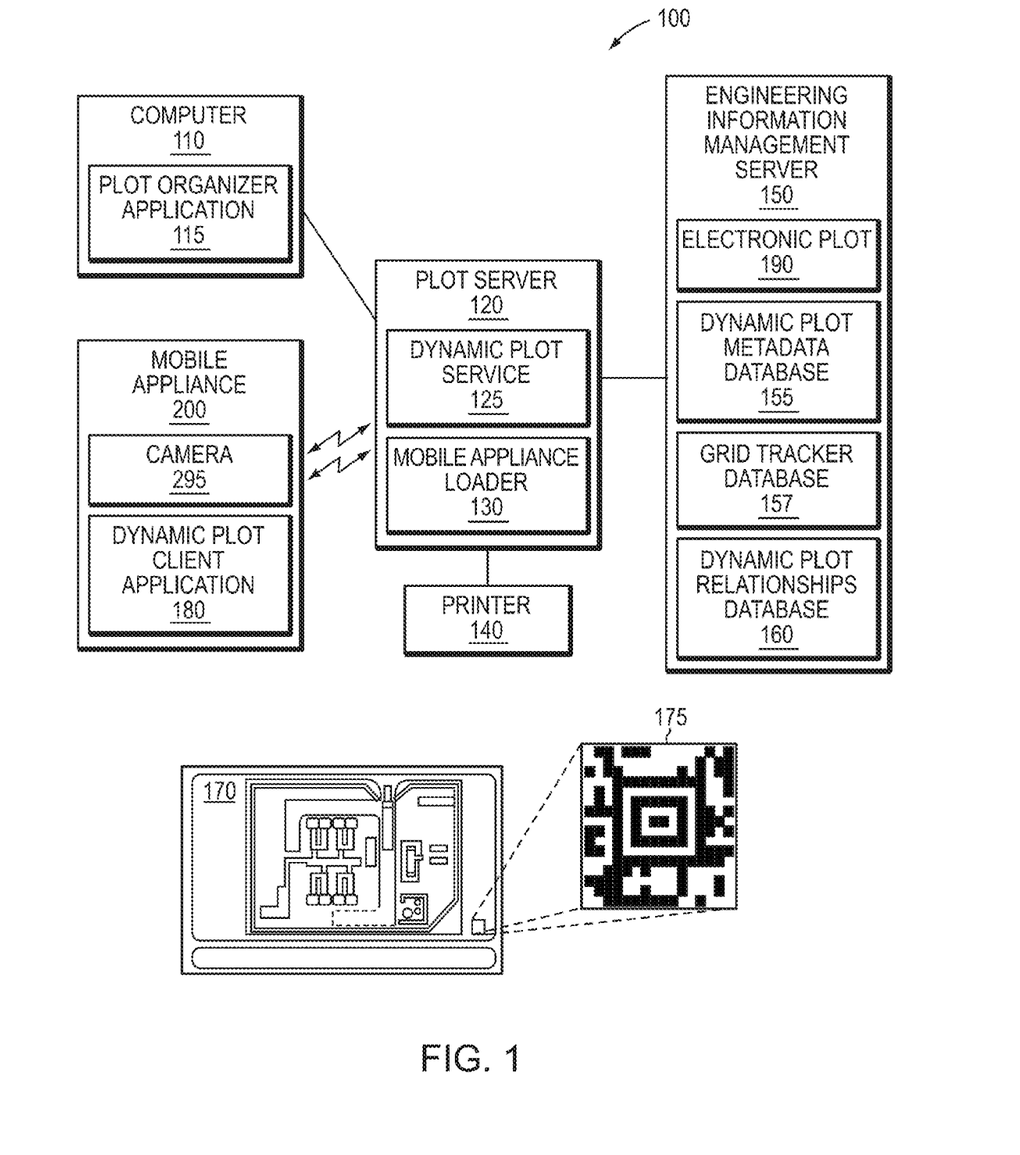
FIG. 1 is a schematic block diagram of an example architecture that may be used to produce and interact with a dynamic plot.

FIG. 1 is a schematic block diagram of an example architecture 100 that may be used to produce and interact with a dynamic plot. While not explicitly shown in FIG. 1, it should be understood that each of the processing systems (e.g., computers and servers) depicted may include conventional computing hardware, including one or more processors configured to execute instructions stored in a computer-readable medium, such as a volatile or persistent memory, a hard-disk, a compact disk (CD), etc. Further, it should be understood that each of the processing systems (e.g., computers and servers) may be interconnected by any of a variety of network connections, including both wired and wireless connections.

The example architecture 100 includes a computer 110 executing a plot organizer application 115 that organizes and submits electronic plots for printing and/or archiving. While the plot organizer application 115 may take on any of a variety of forms, in one configuration, the plot organizer application 115 is a ProjectWise InterPlot® Organizer available from Bentley Systems, Inc. of Exton, Pa.

The example architecture 100 further includes a plot server 120 that includes functionality to processes electronic plot print jobs from the plot organizer application 115, and to retrieve and pass data to an engineering information management server 150 as needed. The plot server 120 may execute a dynamic plot service 125 to perform these tasks. Among other functions, the dynamic plot service 125 may rasterize an electronic plot into a bitmap image and send this bitmap image to a printer 140 to produce at least one dynamic plot 170. While the plot server 120 may take on any of a variety of forms, in one configuration, the plot server 120 is a ProjectWise® Plot Server available from Bentley Systems, Inc. of Exton, Pa. The plot server 120 may also execute a mobile application loader 130 that loads information related to the dynamic plot onto the mobile appliance 200 to enable the techniques described herein.

The engineering information management server 150 may maintain at least one electronic plot 190, as well as a variety of types of other engineering data. As part of the maintained data, the engineering information management server 150 may include a dynamic plot metadata database 155 storing information concerning dynamic plot properties, including related object properties data. The dynamic plot metadata database 155 may further include a grid tracker database 157. Further, the engineering information management server 150 may also store a dynamic plot relationships database 160 that maps unique plot identifiers associated with dynamic plots to file unique identifiers and other payload information used in identifying corresponding electronic plots and metadata in the engineering information management server 150. While the engineering information management server 150 may take on any of a variety of forms, in one configuration, the engineering information management server 150 is a ProjectWise® Server available from Bentley Systems, Inc. of Exton, Pa.

The example architecture 100 further includes at least one dynamic plot 170, for example, a dynamic plot printed by printer 140. The dynamic plot 170 may include an identifier, for example a barcode 175, that indicates a unique plot ID associated with the dynamic plot 170. The unique plot ID may be used in accessing the corresponding metadata in the engineering information management server 150 used in creating augmented reality views of the dynamic plot 170.

The example architecture 100 further includes a mobile appliance 200 including a camera 295, and configured to execute a dynamic plot client application 180. The mobile is appliance 200 may communicate with the plot server 200 via a long-range wireless connection, a wired link, a short-range wireless connection, or the like.

Figure 2:
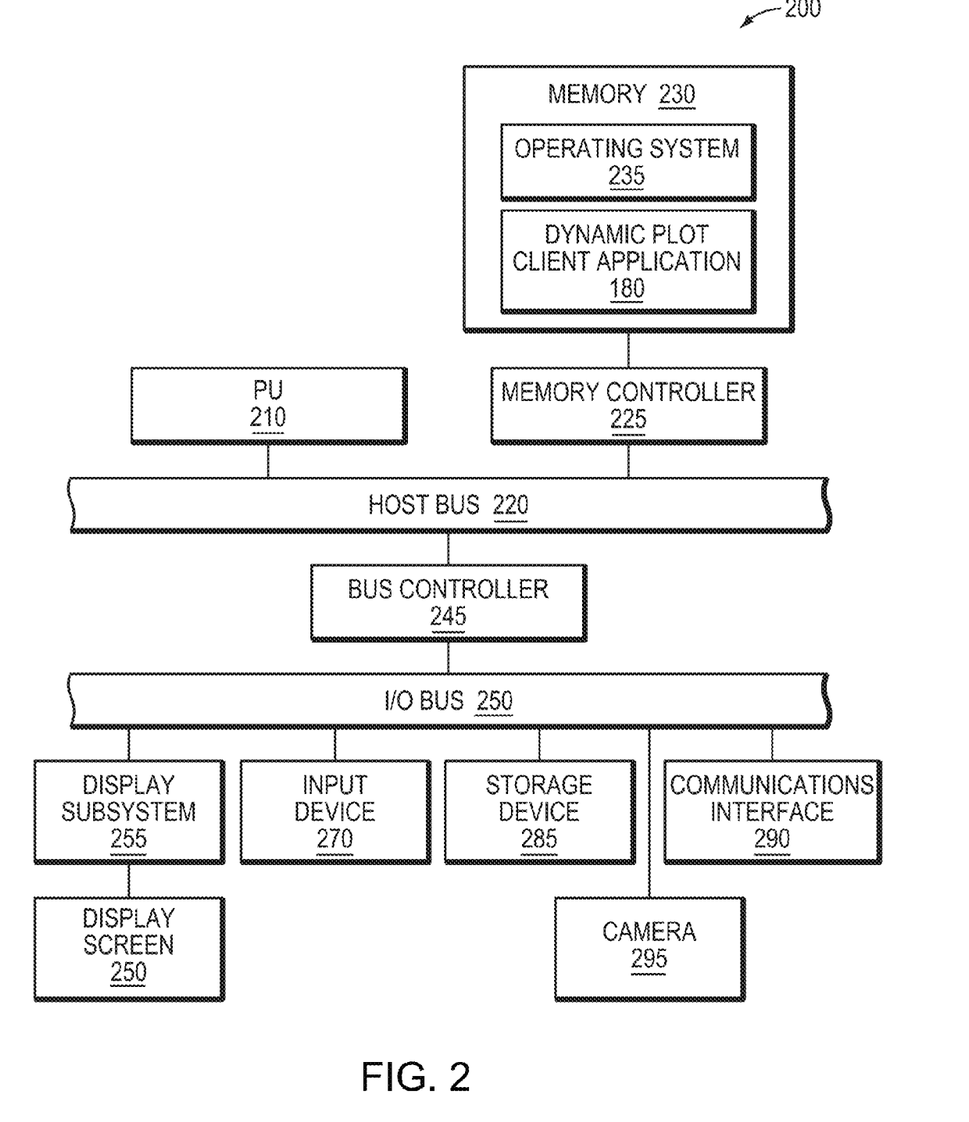
FIG. 2 is a schematic block diagram of an example mobile appliance that may be used in the example architecture of FIG. 1.

FIG. 2 is a schematic block diagram of an example mobile appliance 200 that may be used in the example architecture of FIG. 1. The mobile appliance 200 includes at least one processing unit (PU) 210 coupled to a host bus 220. The PU 110 may be any of a variety of commercially available processors, such as an Intel x86 processor, or another type of processor. A volatile memory 230, such as a Random Access Memory (RAM), is coupled to the host bus 220 via a memory controller 225. The memory 230 is configured to store at least a portion of an operating system 235 while the portable electronic device 100 is operating.

In addition, the memory 230 may store portions of application software, including portions of the dynamic plot client application 180 while the mobile appliance 200 is operating. The host bus 220 of the mobile appliance 200 is coupled to an input/output (I/O) bus 250 through a bus controller 245. A display subsystem 255, coupled to a display screen 260, is coupled to the I/O bus 250. The display screen 260 may show a user interface of the dynamic plot client application 180. One or more input devices 270, such as a keyboard or a touchpad, may also be provided and used for interaction with the mobile appliance 200.

A persistent storage device 285, such as hard disk drive, a solid-state drive, or other type or persistent data store, is coupled to the I/O bus 250, and may persistently store data, including computer-executable instructions. Persistently stored data may be loaded to the volatile memory 230 when needed. For example, computer-executable instructions related to the operating system 235 and the dynamic plot client application 180 may be stored in the persistent storage device 285 until they are needed. The I/O bus 250 may further be coupled to a communication interface 290 that interfaces with the above discussed wireless connection or a wireless connection to the plot server 120

Finally, a camera 295, for example, a video camera such as a webcam, is coupled to the I/O bus 250. The camera 295 may be used to capture the identifier (e.g., the barcode) printed on the dynamic plot 170, which is subsequently decoded to determine the unique plot ID. Using the unique plot ID, corresponding metadata, including related object properties data, for the dynamic plot 170 may be obtained. The camera 295 further captures images of objects in the dynamic plot 170, which may be augmented using augmented reality techniques and displayed as graphic elements in a user interface of the dynamic plot client application 180 on the display screen 260.

Figure 3:
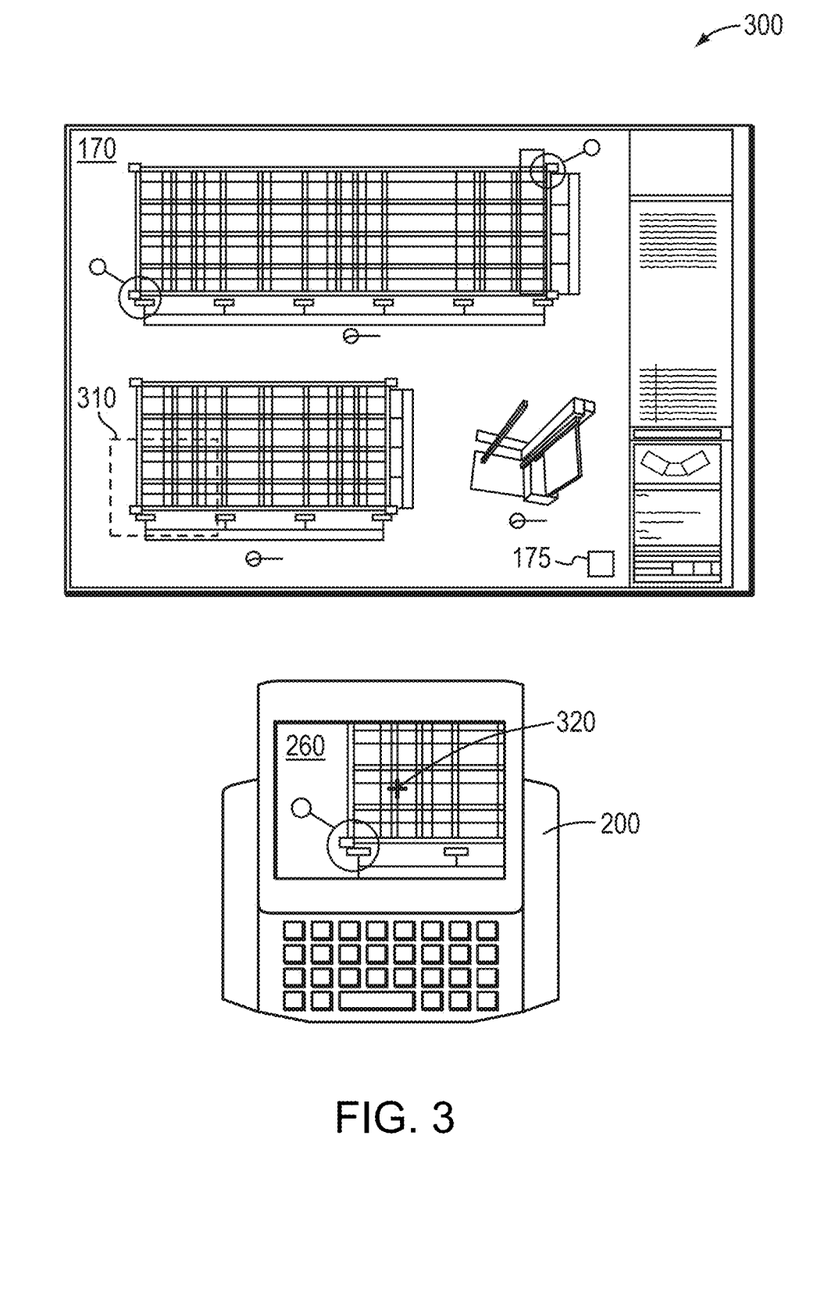
FIG. 3 is a diagram of an example user interface of the dynamic plot client application on a display screen of a mobile appliance, showing a portion of a dynamic plot captured by the camera.

FIG. 3 is a diagram 300 of an example user interface of the dynamic plot client application 180 on a display screen 260 of a mobile appliance 200, showing a portion of a dynamic plot 170 captured by the camera 295. As can be seen in FIG. 3, the dynamic plot 170 includes a schematic diagram of a structure. A portion 310 of that schematic diagram of the structure is captured by the camera 295. Such portion is then displayed as a series of graphic elements in the user interface of the dynamic plot client application 180 on the display screen 260 of the mobile appliance 200. A user may reposition the camera 295 of the mobile appliance 200 with respect to the dynamic plot 170, such that a different portion of the schematic diagram will be captured by the camera 295 and displayed on the display screen 260. For example, the user may pan the camera 295 across the dynamic plot 170, and zoom in, or zoom out, on the dynamic plot 170, by adjusting the distance between the camera and the dynamic plot 170. The graphic elements shown on the display screen 260 of the mobile appliance 200 may be augmented with additional information from stored metadata, beyond what is printed on the dynamic plot 170. For example, the user may select a graphic element by repositioning the camera 295 of the mobile appliance 200 with respect to the dynamic plot 170, such that a crosshairs 320 overlays a particular object for which properties are desired. Such properties may be retrieved from the metadata and overlaid on the display screen 260. Details of how such properties may be retrieved are described in U.S. patent application Ser. No. 12/557,392, which is incorporated by reference above.

So that the appropriate properties may be retrieve, it may be necessary to determine which particular graphic element(s) the crosshairs 320 overlay. Since the graphic elements displayed in the user interface of the dynamic plot client application 180 on the display screen 260 of the mobile appliance 200 are derived from images of the dynamic plot 170 taken by the camera 295, geometric definitions of the graphic elements typically are not available on the mobile appliance 200. As such, element identification techniques is that rely on geometric definitions may not be readily employed. Further, the mobile appliance 200 typically has limited processing power, limited storage capabilities, and the like, precluding the use of many element identification techniques.

Identifying and/or Highlighting a Graphic Element

In one embodiment, improved techniques are provided for identifying and/or highlighting a graphic element that may operate absent the use of geometric definitions of graphic elements, and without consuming large amounts of processing power and/or other resources. When a plot is defined, a processing system creates a special multi-dimensional data structure (e.g., a two-dimensional location buffer) that aids eventual graphic element identification and selection by a user. For each "active" point (e.g., dot or pixel that includes some element) in the plot, the multi-dimensional data structure stores a corresponding GUID that indicates one or more graphic elements present at the point (e.g., a rendition identifier (ID)). The corresponding GUID is stored at a location in the multi-dimensional data structure that corresponds to the location of the point in the plot. The multi-dimensional data structure may be persistently maintained in connection with the plot, and used across multiple sessions of a graphics program (e.g., across multiple sessions of a dynamic plot client application 180).

A user may view the plot and select a point (a selected point) in the plot. When a user selects a point (a selected point) in the plot, the location of the selected point (e.g., an x-axis and y-axis coordinate associated with a two-dimensional coordinate space) may be used by the processing system as an index into the multi-dimensional data structure to retrieve the GUID of the one or more graphic elements. If the retrieved GUID corresponds to a single graphic element, the graphics program identifies that graphic element, and, for example, retrieves properties or other information associated with that graphic element for display. If the retrieved GUID corresponds to multiple graphic elements, the graphics program may identify multiple graphic elements, or further techniques may be employed to pinpoint a single graphic element. For example, properties of each of the graphic elements may be retrieved, or, alternatively, a user may be prompted to select from a list one of the multiple graphic elements for which properties are desired. Further, is the graphics program may highlight one or more graphic elements corresponding to the retrieved GUID on the display screen, by iterating over locations within the multi-dimensional data structure, identifying locations that share the retrieved GUID, and changing the visual display (e.g., the color of, the translucency of, etc.) pixels on the display screen that correspond to the identified locations that share the retrieved GUID.

Figure 4:
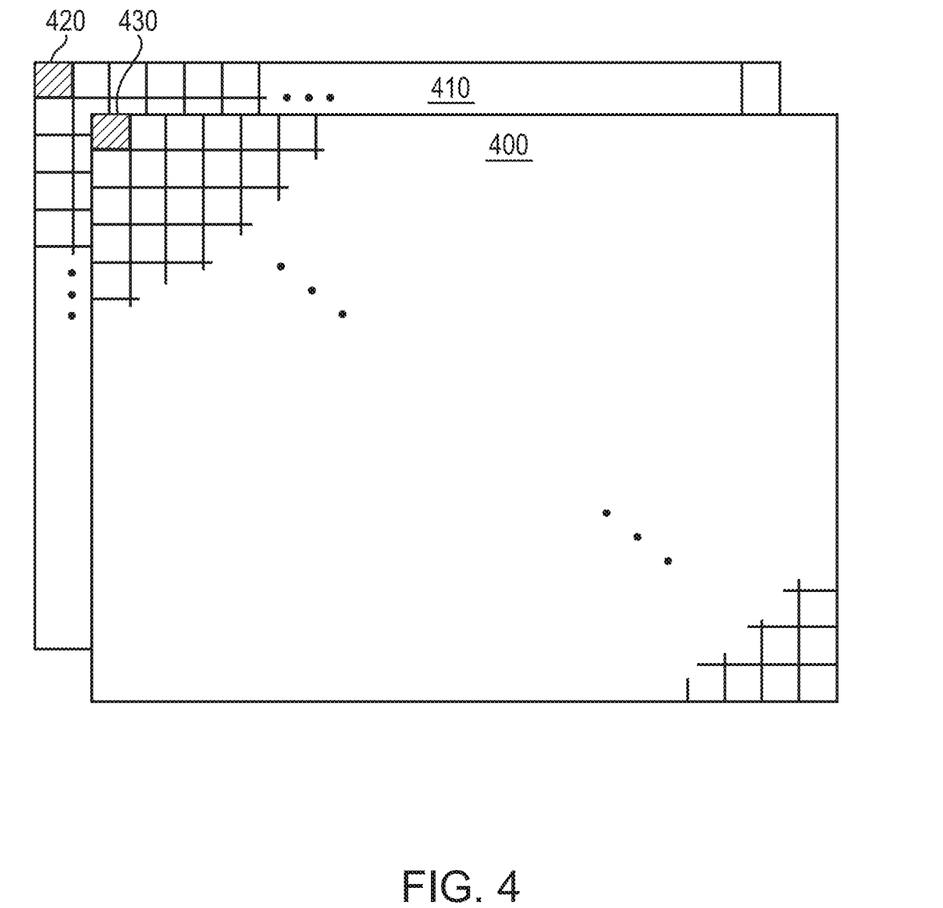
FIG. 4 is a block diagram of an example multi-dimensional data structure (e.g., location buffer) that may be used with the techniques described herein for identifying and highlighting a graphic element.

The improved techniques for identifying and/or highlighting a graphic element may be used in conjunction with above described techniques for displaying an augmented reality view of a dynamic plot on a display screen 260 of a mobile appliance 200. In such an embodiment, the multi-dimensional data structure may take the form of a two-dimensional location buffer 400 (referred to hereinafter simply as a "location buffer") and the corresponding GUID of a point in a plot may take the form of a rendition ID. When an electronic plot 190 is printed to produce a dynamic plot 170, the dynamic plot service 125 may perform rasterization operations to produce a bitmap image suitable for use by the printer 140. At such time, the dynamic plot service 125, or another entity, may also create the location buffer. The location buffer may be persistently stored on the mobile appliance 200 where it is accessible by the dynamic plot client application 180, or alternatively may be maintained at a remote location, for example on the engineering information server 150, or elsewhere, that is accessible via a network connection. By creating the location buffer at the time the dynamic plot 170 is initially created, later processing for such operation may be avoided when the dynamic plot client application 180 is actually used on the mobile appliance 200, thereby reducing latency.

FIG. 4 is a block diagram of an example multi-dimensional data structure (e.g., location buffer) 400 that may be used with the techniques described herein for identifying and highlighting a graphic element. For purposes of illustration, pixels are shown in FIG. 4 much larger than they would be in a practicable system. When an electronic plot 190 is rasterized into a bitmap image 410 suitable for printing or display, each "active" pixel (i.e. a pixel that shows some portion of a graphic element as opposed to empty space) in the bitmap image 410 is associated with a rendition ID that identified one or more graphic elements present at that point. The corresponding rendition ID is stored at a location in the location buffer 400 that corresponds to the location of the "active" pixel in the is bitmap image. If no graphic element is located at a particular position, and thus there is no corresponding rendition ID, the corresponding location in the location buffer 400 may simply be left empty, or loaded with a predetermined identifier. The pixels and the locations of the location buffer 400 may be indexed by a coordinate system, for example, by x-axis and y-axis coordinate. For example, a pixel (1,1) 420 of the bitmap image 410 of the plot may correspond to a location (1,1) 430 of the location buffer 400 that stores a rendition ID corresponding to one or more graphic elements depicted by such pixel.

Figure 5:
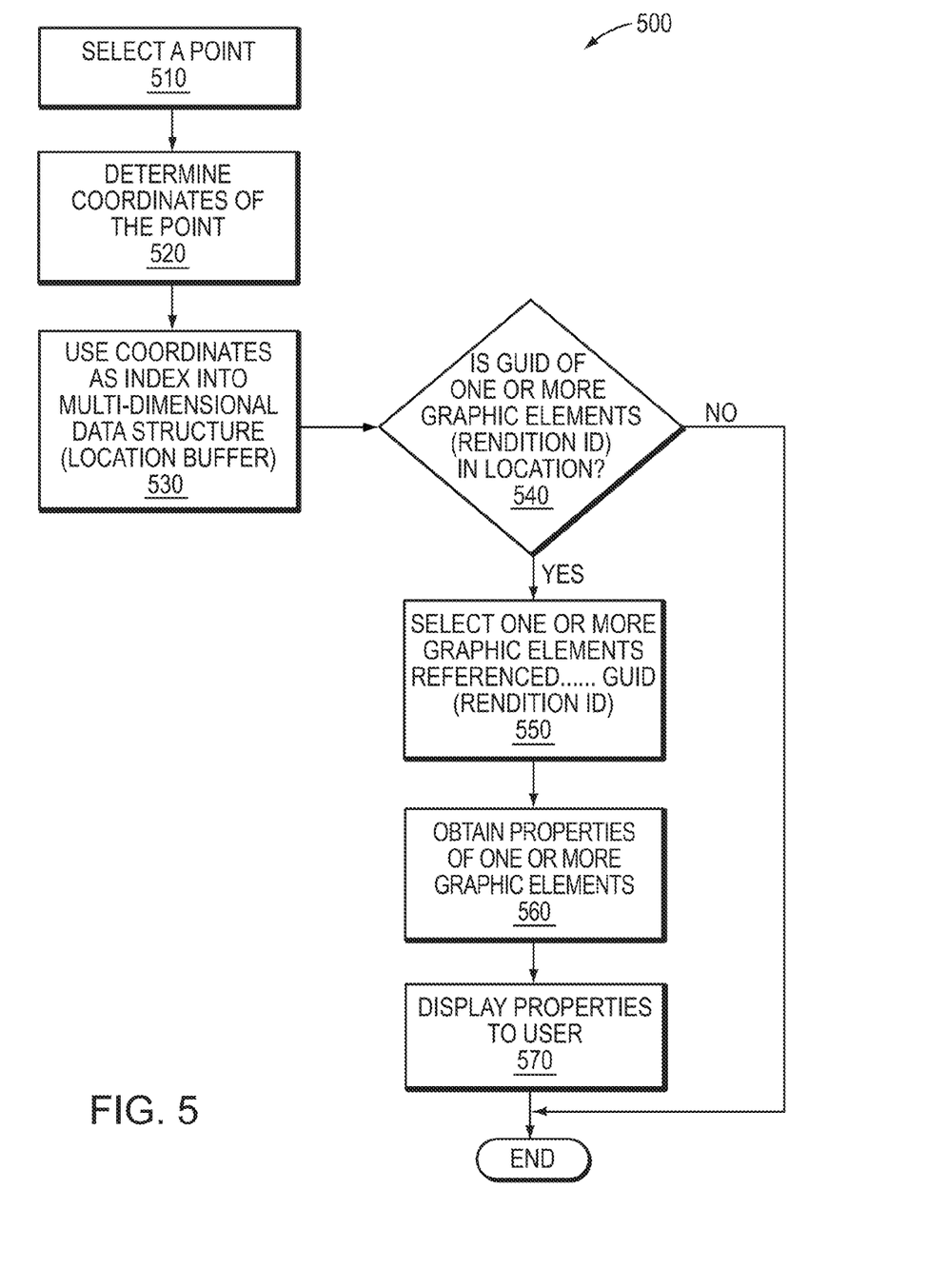
FIG. 5 is flow diagram of an example sequence of steps for using the example multi-dimensional data structure (e.g., location buffer) to identify a graphic element and to display properties of the graphic element, for example, in conjunction the display of an augmented reality view of a dynamic plot.

FIG. 5 is flow diagram of an example sequence of steps for using the example multi-dimensional data structure (e.g., location buffer) 400 to identify a graphic element and to display properties of the graphic element, for example, in conjunction the display of an augmented reality view of a dynamic plot. At step 510, a user viewing a display may select a point (a selected point), for example, by manipulating the position of the camera 295 of the mobile appliance 200, so crosshairs 320 displayed on a display screen 260 of the mobile appliance 200 are positioned upon a desired point in a dynamic plot, according to the techniques described in U.S. patent application Ser. No. 12/557,392, or by use of some other input device 270. At step 520, coordinates of the selected point in the coordinate space of the dynamic plot (e.g., an x-axis and a y-axis coordinate associated with a two-dimensional coordinate space of the piece of paper) are determined. At step 530, the location of the selected point, and more specifically the coordinates of the selected point, are used as an index into the location buffer 400, to determine a particular location in the location buffer 400 that coincides with the point in the dynamic plot 170. At step 540, a determination is made whether there is GUID that indicates one or more graphic elements present at the selected point (e.g., a rendition ID) stored in the particular location in the location buffer. If not, the sequence of steps ends. If so, at step 550, the rendition ID is retrieved and one or more graphic elements referenced by the rendition ID are identified. If the retrieved rendition ID corresponds to a single graphic element the graphics program identifies that graphic element. As discussed further below, if the retrieved rendition ID corresponds to multiple graphic element, the graphics program may identify all of the graphic elements, or further techniques may be employed to pinpoint a single graphic element from among the multiple graphic elements. At step 560, properties of the one or more identified graphic elements are obtained from the dynamic metadata database 155 located on the engineering information management server 150, and transmitted to the dynamic plot client application 180. At step 570, the properties are displayed to a user, via the user interface of the dynamic plot client application 180 on the display screen 260 of the mobile appliance 200.

Figure 6:
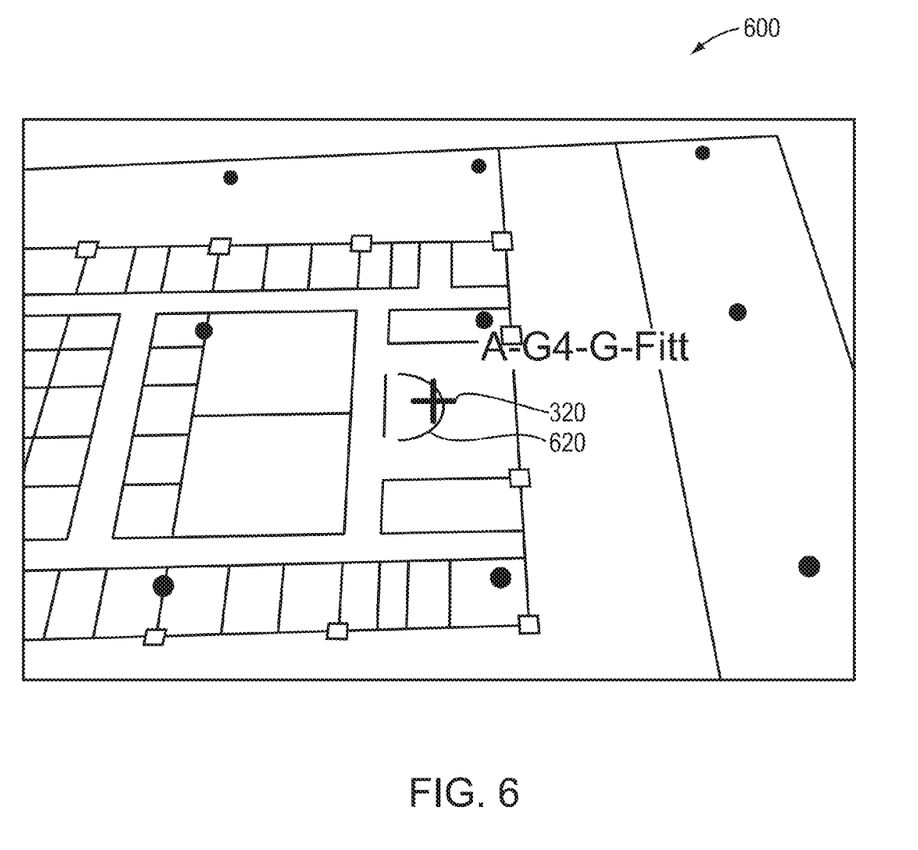
FIG. 6 is an example screenshot illustrating identifying a graphic element and display properties of the graphic element.

FIG. 6 is an example screenshot 600 illustrating identifying a graphic element and display properties of the graphic element. As can be seen in FIG. 6, the crosshairs 320 are displayed on a display screen 260 upon the desired point. Properties of a graphic element 620, in this example, a level the object was placed on, represented by the string "A-G4-G-Fitt," are overlaid and displayed.

Figure 7:
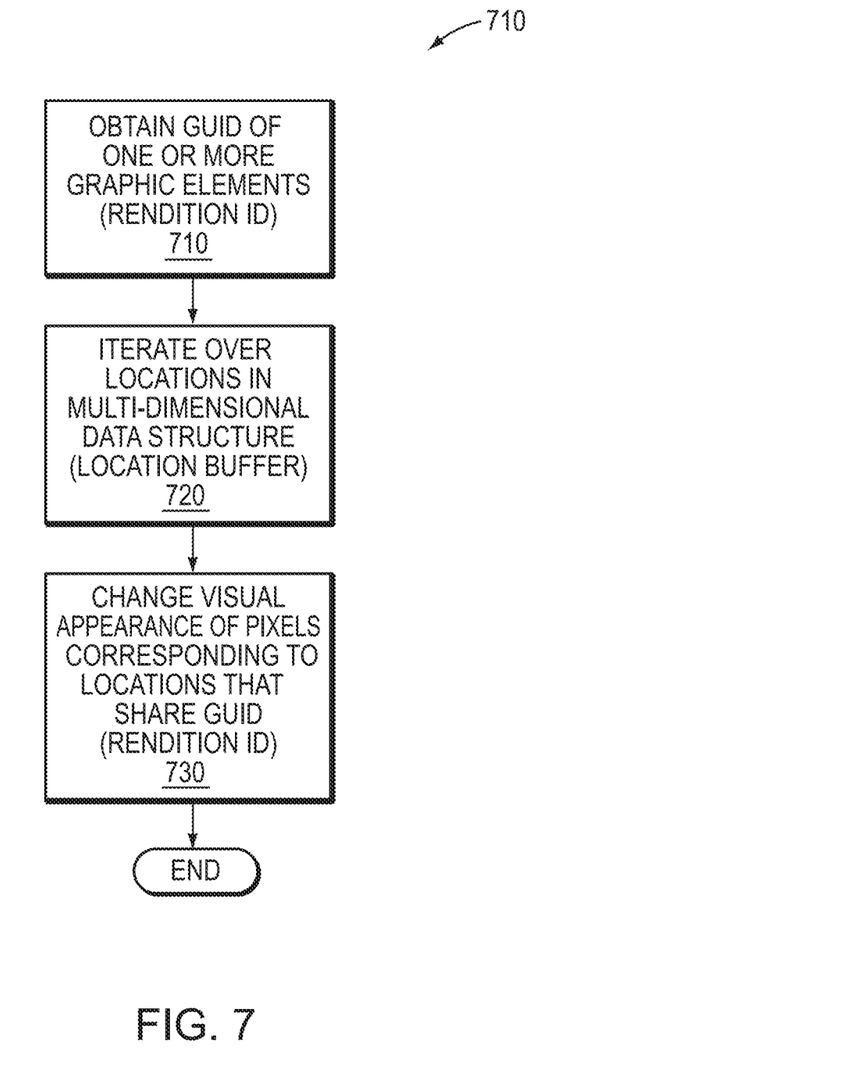
FIG. 7 is a flow diagram of an example sequence of steps for highlight one or more graphic elements that have been indentified.

In some cases it may also be desirable to highlight a graphic element after it has been selected by a user. FIG. 7 is a flow diagram of an example sequence of steps for highlight one or more graphic elements that have been indentified. At step 710 GUID (e.g., rendition ID) of the one or more graphic elements is obtained, according to the techniques described above in relation to FIG. 5. At step 720, the multi-dimensional data structure (e.g., location buffer) 400 is searched by iterating over locations within the location buffer (for example, iterating over all locations, or iterating over all active locations), and identifying locations that share the rendition ID. At step 730, the visual appearance (e.g., the color, translucency, etc.) of points (e.g., dots or pixels) that correspond to the identified locations that share rendition ID are changed on the display screen 260 of the mobile appliance 200 to effectively highlight the one or more graphic elements. For example, in reference to FIG. 6, the points (e.g., dots or pixels) that correspond to the graphic element 620 may be changed to a predetermined, contrasting color.

One potential situation that may arise with the above described techniques is the overlap of graphic elements, such that multiple graphic elements are sometimes represented by a single pixel at a single point on a plot. While more than one graphic element may be at a point, in the embodiment discussed above the multi-dimensional data structure (e.g., location buffer) 400 typically stores a single GUID (e.g., rendition ID) for each point. To address this situation, provision may be made to allow a rendition ID to indicate more than one graphic element (i.e., such that there is not a 1:1 mapping between is rendition IDs and graphic elements).

Figure 8:
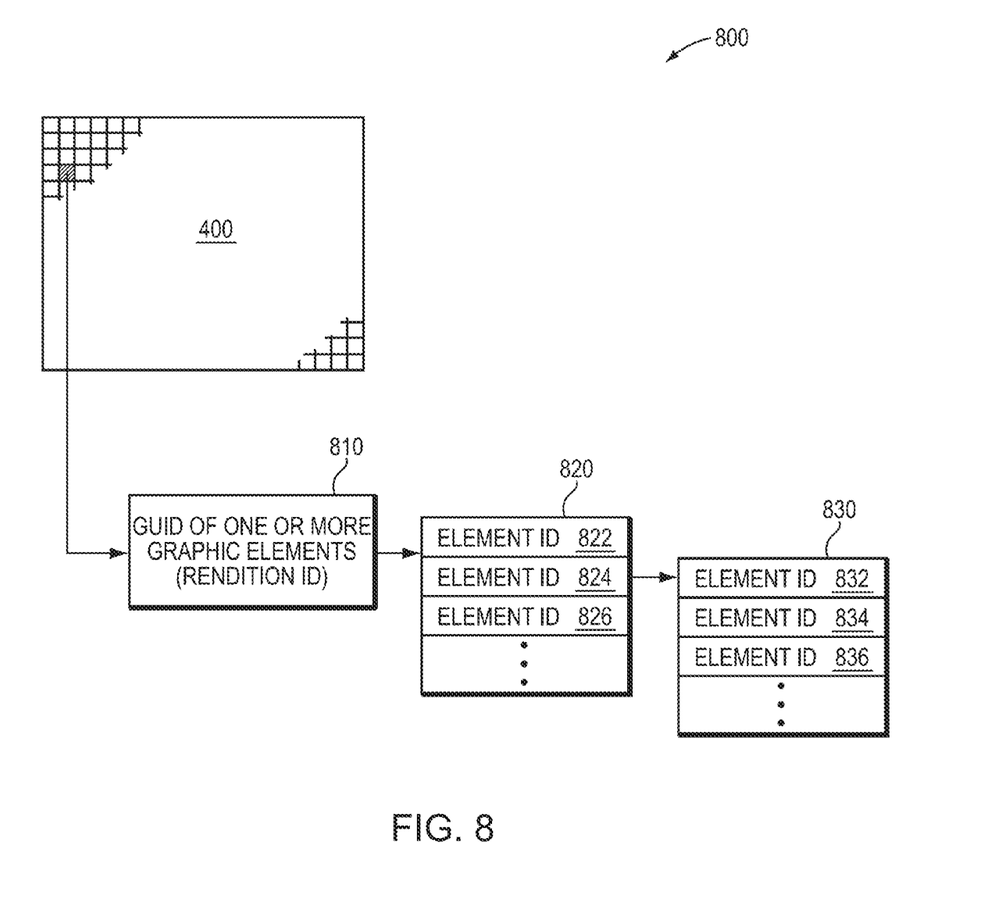
FIG. 8 is a diagram of an example data structure that enables mapping of a GUID (e.g., a rendition ID) that indicates one or more graphic elements to multiple graphic elements.

FIG. 8 is a diagram 800 of an example data structure that enables mapping of a GUID (e.g., a rendition ID) that indicates one or more graphic elements to multiple graphic elements. Each graphic element may be specifically identified by its own unique identifier (e.g., an element ID). As shown in FIG. 8, a location in the location buffer 400 may store a single rendition ID 810. The rendition ID 810 may point to a table 820, or other data structure, that enumerates all the element IDs 822, 824, 826 corresponding to a particular rendition ID 810. A user may be prompted to select a particular graphic element, and thus corresponding element ID, from the element IDs 822, 824, 826. Thereafter, properties 832, 834, 836 of the selected graphic element may be accessed from a properties table 830, or other data structure, referenced by the selected element ID.

While the above description discusses various embodiments of the present disclosure, it should be apparent that a number of modifications and/or additions may be made without departing from the disclosure's intended spirit and scope. It should be understood that many of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), etc. A hardware implementation may include processors, memories, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

The invention claimed is:

1. A method comprising:
creating a multi-dimensional data structure corresponding to a visual representation of information, wherein, for each active point in the visual representation of information, the multi-dimensional data structure has a corresponding location that stores a globally unique identifier (GUID) that indicates one or more graphic elements present at that point in the visual representation;
displaying the visual representation of information in a user interface;
receiving a selection from a user of a selected point in the visual representation of information;
using, by a processing system, a location of the selected point as an index into the multi-dimensional data structure to determine a particular location in the multi-dimensional data structure that coincides with the selected point;
retrieving a particular GUID from the particular location in the multi-dimensional data structure; and identifying, by the processing system, one or more graphic elements that are indicated by the particular GUID.

2. The method of claim 1, further comprising
obtaining properties of the one or more identified graphic elements; and
displaying, in the user interface, properties of the one or more identified graphic elements.

3. The method of claim 1, further comprising:
iterating over locations in the multi-dimensional data structure to determine locations in the multi-dimensional data structure that share the particular GUID; and
changing, in the display of the visual representation of information in the user interface, a visual appearance of points in the display that share the particular GUID, to highlight the one or more graphic elements that are indicated by the particular GUID.

4. The method of claim 3, wherein the changing the visual appearance of the points in the display that share the particular GUID comprises changing a color and/or translucency of the points in the display that share the particular GUID to a predetermined, contrasting color and/or translucency.

5. The method of claim 1, wherein the one or more identified graphic elements are two or more graphic elements, and the identifying further comprises:
using the particular GUID to access a data structure that enumerates element identifiers (IDs) that correspond to the particular GUID, each element ID to identify a different graphic element of the two or more graphic elements.

6. The method of claim 5, wherein the identifying further comprises:
prompting the user to select a particular graphic element of the two or more graphic elements.

7. The method of claim 1, wherein the visual representation of information is a computer aided design (CAD) drawing or model, and each graphic element is a visual representation that corresponds to a component in the CAD drawing or model.

8. The method of claim 1, wherein the multi-dimensional data structure is a two-dimensional location buffer, and the location of the selected point comprises an x-axis coordinate and a y-axis coordinate.

9. The method of claim 1, wherein each active point is an active pixel and the selected point is a selected pixel.

10. The method of claim 1, wherein the GUID that indicates one or more graphic elements is a rendition identifier (ID).

11. The method of claim 1, wherein the visual representation of information is a dynamic plot, displaying the visual representation of information comprises displaying an augmented reality view of the dynamic plot, and receiving the selection from the user of the selected point in the visual representation of information comprises receiving a selection from the user in the augmented reality view of the dynamic plot.

12. An apparatus comprising:
a display screen;
an input device;
a processor;
a memory coupled to the processor and configured to store executable instruction for execution by the processor, the executable instructions, when executed, operable to:
access a multi-dimensional data structure corresponding to a visual representation of information, wherein, for each active point in the visual representation of information, the multi-dimensional data structure has a corresponding location that stores a globally unique identifier (GUID) that indicates one or more graphic elements present at that point in the visual representation,
display the visual representation of information on the display screen,
receive from the input device a selection of a selected point in the visual representation of information,
use a location of the selected point as an index into the multi-dimensional data structure to determine a particular location in the multi-dimensional data structure that coincides with the selected point,
retrieve a particular GUID from the particular location in the multi-dimensional data structure, and
identify one or more graphic elements that are indicated by the particular GUID.

13. The apparatus of claim 12, wherein the executable instructions, when executed, are further operable to obtain properties of the one or more identified graphic elements, and display on the display screen properties of the one or more identified graphic elements.

14. The apparatus of claim 12, wherein the executable instructions, when executed, are further operable to iterate over locations in the multi-dimensional data structure to determine locations in the multi-dimensional data structure that share the particular GUID, and change, in the display of the visual representation of information, a visual appearance of points in the display that share the particular GUID, to highlight the one or more graphic elements that are indicated by the particular GUID.

15. The apparatus of claim 14, wherein the change of the visual appearance of the points in the display that share the particular GUID comprises a change of a color of the points in the display that share the particular GUID to a predetermined, contrasting color.

16. The apparatus of claim 12, wherein the one or more identified graphic elements are two or more graphic elements, and the wherein the executable instructions, when executed, are further operable to use the particular GUID to access a data structure that enumerates element identifiers (IDs) that correspond to the particular GUID, each element ID to identify a different graphic element of the two or more graphic elements.

17. The apparatus of claim 12, wherein the visual representation of information is a computer aided design (CAD) drawing or model, and each graphic element is a visual representation that corresponds to a component of the CAD drawing or model.

18. The apparatus of claim 12, wherein the multi-dimensional data structure is a two-dimensional location buffer and the location of the selected point comprises an x-axis coordinate and a y-axis coordinate.

19. The apparatus of claim 12, wherein the visual representation of information is a dynamic plot, display of the visual representation of information comprises display of an augmented reality view of the dynamic plot, and selection of the selected point in the visual representation of information comprises a selection in the augmented reality view of the dynamic plot.

20. A non-transitory computer readable medium storing executable instructions for execution on a processor, the executable instruction, when executed, operable to:
access a multi-dimensional data structure corresponding to a visual representation of information, wherein, for each active point in the visual representation of information, the multi-dimensional data structure has a corresponding location that stores a globally unique identifier (GUID) that indicates one or more graphic elements present at that point in the visual representation;

receive a selection from a user of a selected point in the visual representation of information;

use a location of the selected point as an index into the multi-dimensional data structure to determine a particular location in the multi-dimensional data structure that coincides with the selected point;

retrieve a particular GUID from the particular location in the multi-dimensional data structure; and identify one or more graphic elements that are indicated by the particular GUID.

* * * * *

UNITED STATES PATENT AND TRADEMARK OFFICE
CERTIFICATE OF CORRECTION

| | | |
|---|---|---|
| PATENT NO. | : 8,438,199 B1 | Page 1 of 1 |
| APPLICATION NO. | : 12/879760 | |
| DATED | : May 7, 2013 | |
| INVENTOR(S) | : Alton B. Cleveland, Jr. et al. | |

It is certified that error appears in the above-identified patent and that said Letters Patent is hereby corrected as shown below:

In the Specification

In col. 1, line 17 should read:
Dynamic Plots," ~~and accorded Cesari and McKenna~~. Accord- In col. 1, line 56 should read:
of ~~is~~ graphic elements, and, more specifically, with a graphic In col. 3, line 9 should read:
which properties are desired. Further, ~~is~~ the graphics program In col. 3, line 46 should read:
~~indentified~~ identified; and In col. 6, line 16 should read:
execute a dynamic plot client application 180. The mobile ~~is~~

In col. 7, line 36 should read:
such, element identification techniques ~~is~~ that rely on geo- In col. 8, line 11 should read:
which properties are desired. Further, ~~is~~ the graphics program In col. 8, line 57 should read:
pixel in the ~~is~~ bitmap image. If no geographic element is located In col. 10, line 11 should read:
between ~~is~~ rendition IDs and graphic elements).

Signed and Sealed this
Eighteenth Day of February, 2014

Michelle K. Lee
*Deputy Director of the United States Patent and Trademark Office*